UNITED STATES PATENT OFFICE.

LOUIS LANE, OF TOLEDO, OHIO.

CONCRETE COMPOSITION.

No. 801,597.  Specification of Letters Patent.  Patented Oct. 10, 1905.

Application filed February 17, 1904. Serial No. 194,083.

*To all whom it may concern:*

Be it known that I, LOUIS LANE, a citizen of the United States, and a resident of Toledo, in the county of Lucas and State of Ohio, have invented a new and Improved Concrete Composition, of which the following is a full, clear, and exact description.

My invention relates to a concrete composition admitting of general use and possessing certain special advantages hereinafter set forth.

My concrete composition consists of an aggregate and a cementing material proper, which unite, and thereby produce a concrete substance having special properties—such as durability, lightness, strength, uniformity of texture, &c.—one special property being the capacity of the substance to receive and retain nails driven therein without breaking or chipping under the blows of the hammer. My concrete composition may also receive screws or pointed instruments of any kind, so that the same may be securely anchored thereto and yet possess sufficient rigidity and strength to make it acceptable for a great variety of purposes.

Walls may be built of this concrete composition by pouring or molding, and other structural members—such as facings, finishes, or parts attached to them—may be made of it, and composite structures may be built up by connecting facings or other parts by means of nails or screws with the body member of the concrete composition. For this purpose the composition requires no special preparation, except such as would qualify it for general use.

Structures built up of ordinary concrete are open to many objections. Outer walls made or faced with it present unsightly appearances, and the substance of ordinary concrete is too brittle to admit of nails, screws, or similar fastenings being anchored into it by driving in like manner as they would be driven into wood.

By means of my concrete composition facings of terra-cotta, marble, wood, and many other materials may be firmly attached to heavy structural members of almost any kind and may be applied as readily as boards to a wooden house. Window and door trimmings and also inside finish, floorings, &c., may be readily nailed on without plugging or drilling or other special preparation and may be given as much security as practicable even if the basic member supporting the concrete be a wooden frame.

If desired, a member may be made of my concrete composition and provided with a "tooth," such that a finish coat of plaster will bond and adhere without cracking when applied directly to the wall or metal or wire lathing. It can be applied directly by means of nails to walls built of my composition, to which rough-casting finish can be applied. To fence-posts the wires or boards may be nailed directly and at any desired point. When my composition is used for railroad beds or ties, the rails can be spiked directly upon the composition at any point desired and with or without suitable cushions nailed thereto. Track-irons for railways can be fastened directly to a bed made of my composition without the use of ties or of embedding attachments or anchor-blocks.

My composition possesses great lightness compared with its strength and readily permits of shipment in dry mixed state to points where no local material is readily obtainable.

My concrete composition is made in four ways, more or less allied, as follows:

First. I take a quantity of Portland cement and infusorial earth, the percentage of the Portland cement being not more than fifty per cent. (50%) by volume dry, and consequently the percentage of the infusorial earth being not less than fifty per cent., (50%,) and admix the two substances together. This makes a very desirable composition. If the infusorial earth be more than eighty per cent. (80%) of the entire mass, the concrete, while penetrable by nails or screws, is rather weak for most purposes, and I recommend that the proportion of the Portland cement be not less than twenty per cent. (20%) of the entire mass.

Second. I admix Portland cement, cellular slag in granulated form, and infusorial earth in the proportion of not more than fifty per cent. (50%) of Portland cement, not less than thirty per cent. (30%) of granulated slag, and not more than twenty per cent. (20%) of infusorial earth by volume dry. A concrete thus made is harder than that made by the use of infusorial earth and Portland cement alone.

Third. I take not more than fifty per cent. (50%) by volume of Portland cement and not less than fifty per cent. (50%) of cellular slag in granulated form and admix the same together.

Fourth. I substitute in either of the above mixtures not over ten per cent. (10%) of black oxid of manganese (manganese dioxid) for a like portion of either aggregate.

The cellular slag may be crushed and separated into various granular sizes for different purposes and may be used with or without the so-called "dust" portion. The slag is preferably as free from sulfur as possible, and should be thoroughly dried before mixing and sacking when intended for storage or shipment.

Having thus described my invention, I claim as new and desire to secure by Letters Patent—

1. A penetrable concrete composition containing cellular slag, Portland cement, infusorial earth and manganese dioxid.

2. A concrete composition, consisting of manganese dioxid, ten per cent., and ninety per cent. of a mixture of Portland cement, cellular slag and infusorial earth.

3. A concrete composition containing cellular slag in the form of comparatively large particles, each of which has a cellular structure, Portland cement, infusorial earth and manganese dioxid.

In testimony whereof I have signed my name to this specification in the presence of two subscribing witnesses.

LOUIS LANE.

Witnesses:
LELA B. HOLLENBECK,
OLIVE N. COLBURN.